US011763207B1

(12) United States Patent
Ben Arie et al.

(10) Patent No.: US 11,763,207 B1
(45) Date of Patent: Sep. 19, 2023

(54) EVALUATING MACHINE LEARNING MODEL PERFORMANCE BY LEVERAGING SYSTEM FAILURES

(71) Applicant: Intuit Inc., Mountain View, CA (US)

(72) Inventors: Aviv Ben Arie, Ramat Gan (IL); Omer Zalmanson, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/103,483

(22) Filed: Jan. 30, 2023

(51) Int. Cl.
*G06N 20/20* (2019.01)
*H04L 9/40* (2022.01)

(52) U.S. Cl.
CPC ......... *G06N 20/20* (2019.01); *H04L 63/1416* (2013.01); *H04L 63/1425* (2013.01)

(58) Field of Classification Search
CPC .. G06N 20/20; H04L 63/1416; H04L 63/1425
USPC .......................................................... 706/12
See application file for complete search history.

(56) References Cited

U.S. PATENT DOCUMENTS

2017/0265076 A1* 9/2017 Richards ............ G06Q 20/3223
2020/0364718 A1* 11/2020 Hindi ..................... G06N 5/043

FOREIGN PATENT DOCUMENTS

WO    WO-2019013974 A1 *  1/2019  .......... H04M 3/2218

OTHER PUBLICATIONS

Fiore et al., "Using generative adversarial networks for improving classification effectiveness in credit card fraud detection", Information Sciences 479 (2019) 448-455 (Year: 2019).*
Awoyemi, et al., "Credit card fraud detection using machine learning techniques", 2017 International Conference on Computing Networking and Informatics (ICCNI), Oct. 29-31, 2017 (Year: 2017).*

* cited by examiner

*Primary Examiner* — Tsu-Chang Lee
(74) *Attorney, Agent, or Firm* — Ferguson Braswell Fraser Kubasta PC

(57) ABSTRACT

A method including monitoring, using a machine learning model, network events of a network. The machine learning model generates fraud scores representing a corresponding probability that a corresponding network event is fraudulent. The method also includes detecting a failure of the machine learning model to generate, within a threshold time, a given fraud score for a given network event. The method also includes determining, by the machine learning model and after the threshold time, the given fraud score. The method also includes logging, responsive to detecting the failure, the given network event in a first table, including logging the given fraud score. The method also includes determining a metric based on comparing the first table to a second table which logs at least the given fraud score and the fraud scores. The method also includes generating an adjusted machine learning model based on the metric.

20 Claims, 5 Drawing Sheets

EVALUATING MACHINE LEARNING MODEL PERFORMANCE BY LEVERAGING SYSTEM FAILURES

BACKGROUND

Machine learning models may find hidden patterns in data in order to make a wide variety of predictions. For example, one or more machine learning models may monitor login-in activities to an online system, such as software-as-a-service (SAS) hosted by a server, and ongoing use of the online system in order to make predictions regarding use of the online system.

In a more particular example, the one or more machine learning models may predict whether a login attempt or ongoing use of the online system is fraudulent. If use of the online system is predicted to be fraudulent, then a user's access to the online system may be blocked.

SUMMARY

The one or more embodiments provide for a method. The method includes monitoring, using a machine learning model, network events of a network. The machine learning model generates fraud scores. Each of the fraud scores represents a corresponding probability that a corresponding network event of the network events is fraudulent. The method also includes detecting a failure of the machine learning model to generate, within a threshold time, a given fraud score for a given network event in the network events. The method also includes determining, by the machine learning model and after the threshold time, the given fraud score. The method also includes logging, responsive to detecting the failure, the given network event in a first table. Logging includes logging the given fraud score. The method also includes determining a metric based on comparing the first table to a second table. The second table logs at least the given fraud score and the fraud scores. The method also includes generating an adjusted machine learning model by adjusting the machine learning model based on the metric.

The one or more embodiments also provides for a system. The system includes a processor and a network adapter in communication with the processor, the network adapter establishing communication between the processor and a network. The system also includes a data repository in communication with the processor. The data repository stores network events received over the network. The data repository also stores fraud scores representing a corresponding probability that a corresponding network event of the network events is fraudulent. The fraud scores includes a given fraud score for a given network event in the network events. The data repository also stores a threshold time. The data repository also stores a first table storing first information related to the given network event, including at least the given fraud score. The data repository also stores a second table storing second information related to the network events, including at least the given fraud score and the fraud scores. The data repository also stores a metric indicating a measure of performance of a machine learning model. The system also includes the machine learning model which, when executed by the processor, monitors the network events to generate prediction scores for the network events. The prediction scores represent probabilities that the network events are fraudulent. The system also includes a server controller which, when executed by the processor, is programmed to detect a failure of the machine learning model to generate, within the threshold time, the given fraud score. The server controller is further programmed to receive, from the machine learning model, the given fraud score after the threshold time. The server controller is further programmed to log the given fraud score in the first table. The server controller is further programmed to determine the metric based on comparing the first table to the second table. The server controller is further programmed to adjust the machine learning model, based on the metric, to generate an adjusted machine learning model.

The one or more embodiments also provide for a non-transitory computer readable storage medium storing program code which, when executed by a processor, performs a computer-implemented method. The computer-implemented method includes The computer-implemented method includes monitoring, using a machine learning model, network events of a network. The machine learning model generates fraud scores. Each of the fraud scores represents a corresponding probability that a corresponding network event of the network events is fraudulent. The computer-implemented method also includes detecting a failure of the machine learning model to generate, within a threshold time, a given fraud score for a given network event in the network events. The computer-implemented method also includes determining, by the machine learning model and after the threshold time, the given fraud score. The computer-implemented method also includes logging, responsive to detecting the failure, the given network event in a first table. Logging includes logging the given fraud score. The computer-implemented method also includes determining a metric based on comparing the first table to a second table. The second table logs at least the given fraud score and the fraud scores. The computer-implemented method also includes generating an adjusted machine learning model by adjusting the machine learning model based on the metric.

Other aspects of the invention will be apparent from the following description and the appended claims.

DETAILED DESCRIPTION

Figure 1:
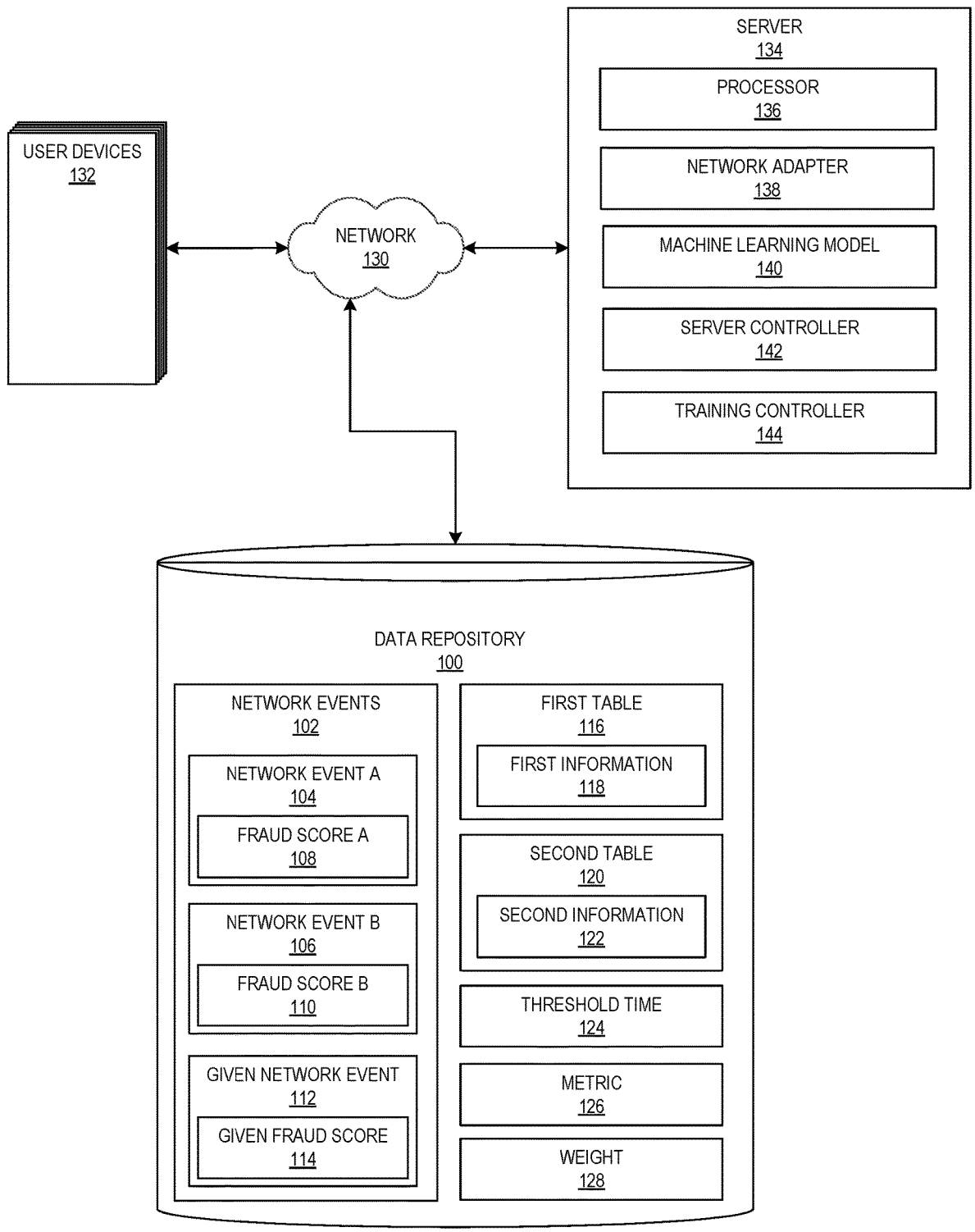
FIG. 1 shows a computing system, in accordance with one or more embodiments.

In general, embodiments are directed to improving machine learning models designed to detect and block fraudulent electronic transactions. Such a model may be referred-to as anti-fraud model, which may include multiple machine learning models operating as an ensemble. An anti-fraud model protects a protected subject. The protected subject may be a website, an enterprise, one or more computers in a possibly distributed environment, and online marketplace, etc.

More specifically, the one or more embodiments are directed to monitoring the performance of anti-fraud models, without deliberately permitting fraud to take place. The one or more embodiments then use the resulting monitoring data to improve the performance of the anti-fraud models.

In the art of machine learning, and in science in general, control groups may be used to model the performance of a system or to test the effectiveness of a system. For example, in medicine, a control group may be a group of patients, who consent to the study, that receive a placebo instead of receiving a real drug being tested. Another group of patients, the test group, receives the real drug. A comparison can then be made between the results in the control group and results in the test group in order to determine the effectiveness of the real drug. Control groups also may be used in the monitoring and improvement of anti-fraud models.

For example, in the case of anti-fraud models, prior practice was to deliberately allow a certain percentage of fraudulent transactions to incur. In effect, the company or enterprise operating the anti-fraud models or the protected subject deliberately, if temporarily, turn off or disable the anti-fraud models in order allow a cyber criminal to commit fraud on the protected subject. The known deliberate fraudulent transactions forms a control group which may be used to monitor and subsequently improve the operation of the anti-fraud models. However, even if the control group is kept small, the resulting permitted fraud may be costly to the company or entity maintaining the protected subject.

The one or more embodiments address, among other issues, eliminate or reduce the use of such deliberate control groups when monitoring and maintaining anti-fraud models. In particular, the one or more embodiments recognize that anti-fraud model failure due to network latency may be used to establish control groups for monitoring and maintaining anti-fraud models.

Latency, also known as network latency, is a quantitative measure of the amount of time that passes from when a data packet is sent by one computing system and received at another computer system. Latency is often measured in milliseconds in many networks, and thus may not be noticed by a human user. However, latency can be longer in some cases, depending on the operation of hardware or software in a network. The amount of latency may vary over time as network conditions change.

Latency may affect the performance of anti-fraud models, or the protected subject. For example, an anti-fraud model may be programmed with a timeout threshold, such as 100 milliseconds. If the timeout threshold is reached, then the pending electronic transaction is permitted to pass without being checked by the anti-fraud model. The purpose of the timeout threshold may be to prevent user dissatisfaction, as latency problems may be far more common than fraud attempts, and users may become frustrated if the protected subject does not respond promptly.

The one or more embodiments take advantage of the failure, due to latency, of an anti-fraud model to check an incoming transaction. In particular, the model failures are used to establish a control group for monitoring and updating the anti-fraud model. However, the one or more embodiments also take into account the fact that latency-induced model failure may be unpredictable. Such unpredictability, if not accounted for, may lead to establishing unreliable control groups. The one or more embodiments may then be used to monitor and update an anti-fraud model, thereby improving the performance of the anti-fraud model while concurrently saving costs that would have been incurred by deliberately allowing a percentage of fraudulent transactions to occur.

Attention is now turned to the figures. FIG. 1 shows a computing system, in accordance with one or more embodiments.

The system of FIG. 1 includes a data repository (100). The data repository (100) may be a type of storage unit and/or device (e.g., a file system, database, data structure, or any other storage mechanism) for storing data. Further, the data repository (100) may include multiple different, potentially heterogeneous, storage units and/or devices.

The data repository (100) may store information regarding a number of network events (102), such as network event A (104) and network event B (106). A network event is a request or a command transmitted over a network, such as network (130) described below. The network events (102) may be transmitted between one or more user devices (132) to a server (134), described below. The network events (102) may take the form of electronic data packets or some other kind of electronic signal. Examples of network events include, but are not limited to, a login request, a request to perform an electronic transaction, a request to access an enterprise system, a request to use an enterprise system resource after the enterprise system has been accessed, a request for data transfer (e.g., to download information, documents, pictures, etc.), and the like.

Each network event may be associated with a fraud score. Thus, the network event A (104) may be associated with fraud score A (108) and the network event B (106) may be associated with fraud score B (110). A fraud score is a number, or alphanumeric text, which represents a quantified probability or likelihood that the associated network event is fraudulent. The term "associated with" means that the fraud score is assigned to the network event in question. The fraud score A (108) and the fraud score B (110) may be the output of a machine learning model, such as the machine learning model (140), described below. More particularly, the fraud score may be an output of an anti-fraud model. As a specific example, a fraud score may be a probability that the corresponding associated network event is fraudulent.

The network events (102) also may include a given network event (112). The given network event (112) is a particular one of the network events (102) that is being processed according to the one or more embodiments. More particularly, the given network event (112) may be an event for which an anti-fraud model failed to generate, within a threshold time (124), a corresponding fraud score. Thus, similarly, a given fraud score (114) is the fraud score associated with the given network event (112).

The data repository (100) also stores a first table (116). The term "first" is a nonce term used to distinguish the first table (116) from a second table (120), described below, and to distinguish the first information (118) from second information (122), also described below. The first table (116) is a data structure in the form of a matrix or a table. The first table (116) stores first information (118) regarding the given network event (112), including at least the given fraud score (114). The first information (118) may include, but is not limited to, an event identifier for the given network event (112), a timestamp describing when the given network event (112), a user identifier indicating the identity of a user or remote computing system which initiated the given network event (112), a weight assigned to the given network event (112), and possibly other information regarding the given network event (112). The weight may be the weight (128), described below. In summary, the first table (116) stores the first information (118) that describes or is associated with the given network event (112).

Note that while the given fraud score (114) may not have been determined within the threshold time (124), due to latency, nevertheless the given fraud score (114) is still determined. While the machine learning model (140) may not have been able to determine the given fraud score (114) within a sufficient time to block a fraudulent given network event (112), the machine learning model (140) still eventually determines the given fraud score (114). The determination of the given fraud score (114) is used as part of monitoring and updating the machine learning model (140), as described further with respect to FIG. 2 through FIG. 4.

The data repository (100) stores a second table (120), which stores second information (122). Again, the term "second" is a nonce term used to distinguish the second table (120) from the first table (116), and to distinguish the second information (122) from the first information (118). The second table (120) is also a data structure which may take the form of a matrix or table.

The second information (122) is data describing at least a portion, if not all, of the network events (102), including at least the network event A (104), the fraud score A (108), the network event B (106), the fraud score B (110), the given network event (112), and the given fraud score (114). The second information (122) also may store other information, such as the information described above with respect to the first information (118). In other words, the second table (120) may store the kind of information described above for the first information (118), but for at least some, possibly all, of the network events (102) including the given network event (112) for which the machine learning model (140) failed to generate a fraud score within the threshold time (124). Optionally, the second information (122) may include type of information in addition to, or different than, the first information (118) stored in the first table (116).

As indicated above, the data repository (100) also may store the threshold time (124). The threshold time (124) is a quantitative number. If an amount of time that exceeds the quantitative number passes before the machine learning model (140) generates a fraud score for one or more of the network events (102), then the anti-fraud system permits the one or more of the network events (102) to proceed. It is possible that the one or more of the network events (102) that proceeds unchecked may be fraudulent, and thus some fraud may occur. However, such fraud is not deliberately allowed. Any of the network events (102) that proceed because the threshold time (124) is exceeded may be referred to as an instance of the given network event (112).

The data repository (100) also may store a metric (126). The metric (126) is data derived from a comparison between the first table (116) and the second table (120). More specifically, the metric (126) is a measure of the performance of the machine learning model (140). The metric may be, for example, a determination of an effectiveness of the machine learning model (140) at detecting fraudulent network events in the network events (102). The metric (126) is derived from a comparison of the first information (118) with the second information (122).

The metric (126) may be used to modify the machine learning model (140). For example, the metric (126) may be used to determine one or more parameters of a machine learning model during re-training of the machine learning model.

Machine learning training is a process of preparing the machine learning model (140) for a specific task. A training data set is provided, which includes data labeled with known results. A training portion of the training data is used as input to the machine learning model. The output of the machine learning model, executing on the training portion, is compared to the known results of the labels. A determination is made whether convergence occurs. Convergence occurs if, when the output is compared to the known labels, the output is accurate to within a pre-determined degree relative to the known labels. If convergence does not occur, then the difference between the output and the known labels is used to determine a loss function. The loss function is used to modify one or more parameters of the machine learning model (140). The process continues to repeat until convergence occurs, and the machine learning model (140) may be referred to as a trained machine learning model. The trained machine learning model may be tested using the test portion of the training data. If convergence occurs again, then the training phase may be deemed complete. The machine learning model (140) may be used in a deployment phase, in which the machine learning model is provided with unknown data for which the results are not known.

The data repository (100) also may store a weight (128). The weight (128) is a number. The weight (128) is used by multiplying the weight (128) by the given fraud score (114) as part of the monitoring process, as described with respect to FIG. 2.

The purpose of the weight (128) is now described, beginning with a description of why the weight (128) may be useful. Because latency may vary over time and by the geographic location of the transmitting user device (132) or receiving server (134), the use of the given network event (112) to monitor the performance of the machine learning model (140) may be biased with respect to certain times or biased with respect to certain geographic locations. For example, if user devices in Dallas, Texas experience high latency on January 1 (for whatever reason), then the results of analyzing instances of the given network event (112) during January 1 from Dallas, Texas may skew the evaluation of the machine learning model (140). For example, an incorrect assumptions or conclusions may be made, such as that Dallas, Texas is a hotspot of fraudulent activity, or that January 1 is a day during the year in which fraudulent transactions may be more likely to occur.

To mitigate such incorrect assumptions or conclusions, the weight (128) may be applied to the given network event (112). The weight (128) takes into account the variability in times, locations, and other factors that arise due to the intermittent or random nature of latency in the network (130). The use of the weight (128) is described with respect to FIG. 2.

The system shown in FIG. 1 also includes a server (134). The server (134) is one or more computing systems, possibly in a distributed computing environment. The computing systems may be the computing system shown in FIG. 5A, for example.

The server (134) includes a processor (136). The processor (136) is a hardware or a virtual processor which may be used to execute the machine learning model (140), the server controller (142), and the training controller (144) described below. The processor (136) may be the processor described with respect to FIG. 5A.

The server (134) also includes the machine learning model (140). The machine learning model (140) is a computer algorithm which finds patterns in data, classifies input data, or performs other functions. The machine learning model (140), when executed by the processor, monitors the network events (102) to generate prediction scores for the network events. The prediction scores may be fraud scores, such as the fraud score A (108), the fraud score B (110), and the given fraud score (114). Thus, the prediction scores represent probabilities that the network events (102) are fraudulent The server (134) also includes the server controller (142). The server controller (142) is one or more computer algorithms, or application specific hardware, which execute computer readable program code for implementing the methods described with respect to FIG. 2 and FIG. 3, or the example of FIG. 4. The server controller (142) also may control execution of the machine learning model (140).

For example, the server controller (142) may adjust the machine learning model (140) by commanding the training controller (144) to re-train the machine learning model (140) to form an adjusted machine learning model for predicting future network events. The server controller (142) also may replace the machine learning model (140) with a new machine learning model for predicting the future network events. In this manner, the server controller (142) may maintain the machine learning model (140) over time.

In another example, the server controller (142) may monitor new network events and block or permit the new network events. Thus, the server controller (142) may block, responsive to an adjusted machine learning model (140) predicting a new fraud score that is above a threshold fraud score, a new network event. Similarly, the server controller (142) may permit, responsive to the adjusted machine learning model predicting the new fraud score being below the threshold fraud score, the new network event.

The server (134) also includes the training controller (144). The training controller (144) is one or more computer algorithms, or application specific hardware, which execute computer readable program code for training the machine learning model (140). The process of training of the machine learning model (140) is described above.

Figure 5A:
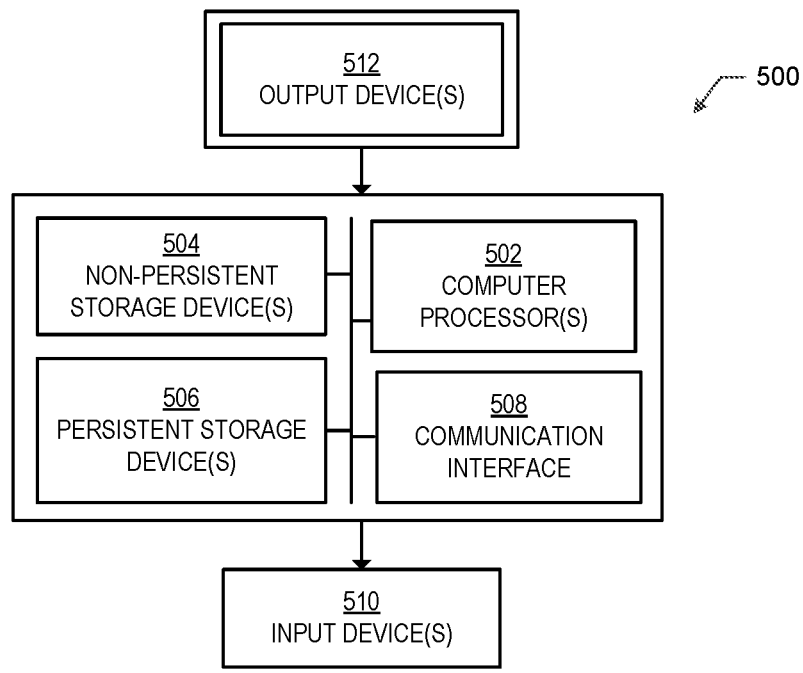
FIG. 5A and FIG. 5B show a computing system and network environment, in accordance with one or more embodiments Like elements in the various figures are denoted by like reference numerals for consistency.
Figure 5B:
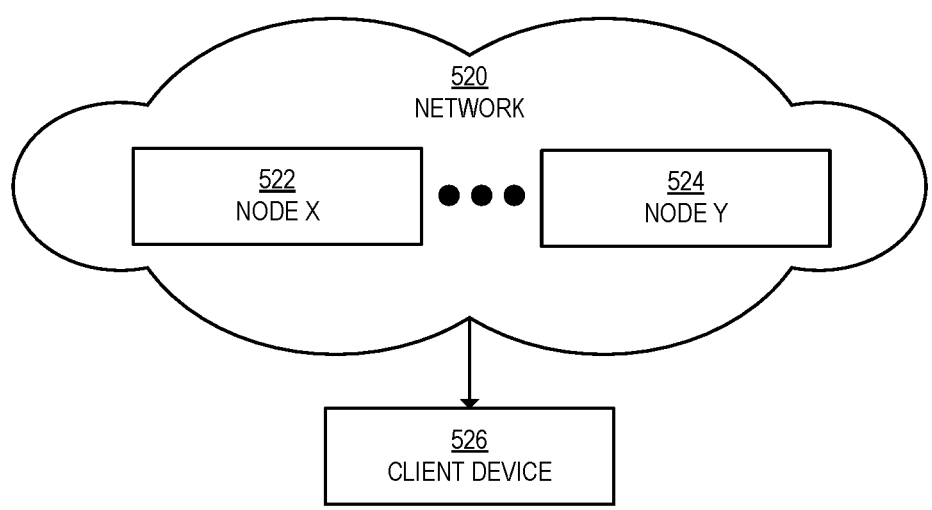

The system shown in FIG. 1 may include other components. For example, the system shown in FIG. 1 may include the network (130). The network (130) is two or more computers communicating with each other over a wired or wireless communication infrastructure. An example of the network (130) is shown in FIG. 5B.

Optionally, the system shown in FIG. 1 may include one or more user devices (132). The user devices (132) are devices that generate or receive one or more of the network events (102). For example, the user devices (132) may be computers used by users to access an enterprise system hosted by the server (134). The machine learning model (140) may protect the enterprise system. Thus, the enterprise system in this example is the protected subject.

However, the user devices (132) may be external to the network shown in FIG. 1. The term "external" means that the user devices (132) may not be under the control of the server (134).

While FIG. 1 shows a configuration of components, other configurations may be used without departing from the scope of the invention. For example, various components may be combined to create a single component. As another example, the functionality performed by a single component may be performed by two or more components.

Figure 2:
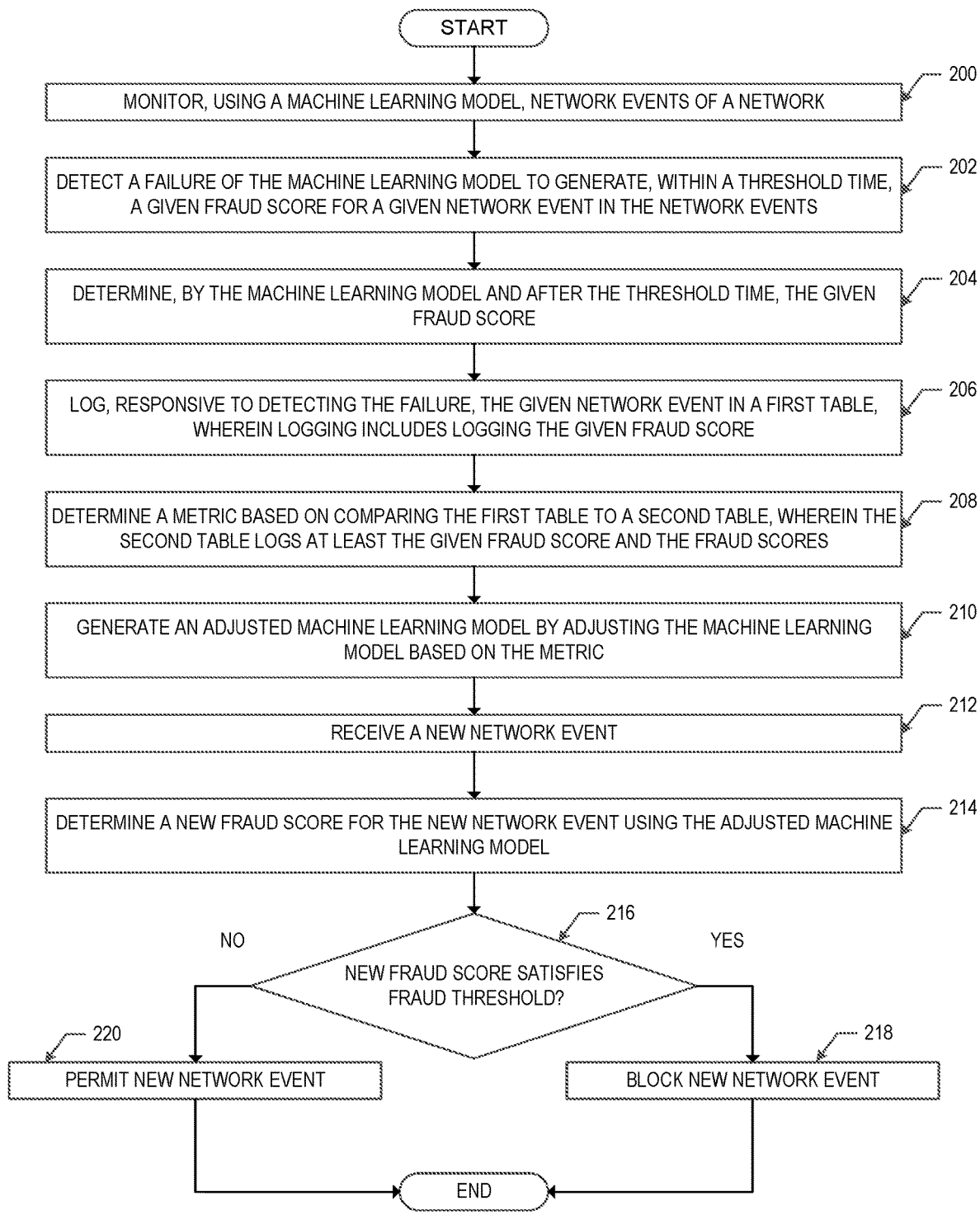
FIG. 2 and FIG. 3 show methods of evaluating machine learning model performance by leveraging system failures, in accordance with one or more embodiments.
Figure 3:
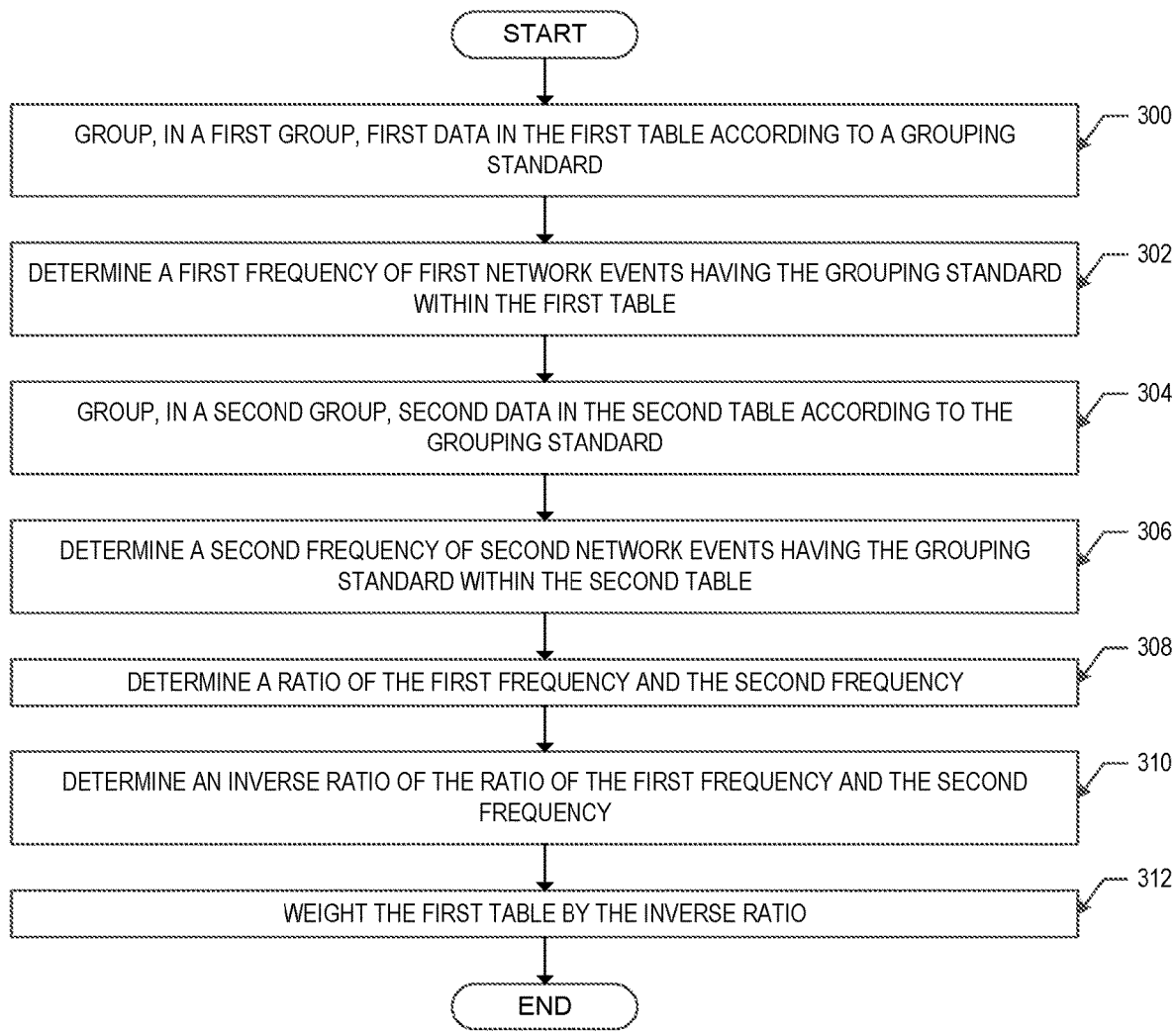

FIG. 2 and FIG. 3 show methods of evaluating machine learning model performance by leveraging system failures, in accordance with one or more embodiments. In particular, FIG. 2 shows a method of adjusting a machine learning model. FIG. 3 shows sub-steps within the method of FIG. 2, and specifically shows a method of comparing tables pursuant to determining a metric at step 208 of FIG. 2. The methods of FIG. 2 and FIG. 3 may be performed using the system shown in FIG. 1, possibly in conjunction with the computing system and network shown in FIG. 5A and FIG. 5B.

Attention is now turned to FIG. 2. Step 200 includes monitoring, using a machine learning model, network events of a network. Monitoring may be performed as follows. First the network events, and possibly metadata associated with the network events, are transformed into a vector. A vector is a data structure, sometimes a one dimensional matrix which is suitable for use as input to a machine learning model. The vector includes features which represent different aspects of the network event or the metadata. Each feature has a value which indicates the presence or degree of the corresponding feature.

After generating the vectors, the vectors are input to an instance of the machine learning model. The machine learning model or models generates, as output, a fraud score indicating a probability that the network event is fraudulent. Thus, the machine learning model or models may generate multiple fraud scores, one for each network event. Each of the fraud scores represents a corresponding probability that a corresponding network event is fraudulent.

Assuming that network latency does not delay generation of the fraud score beyond a threshold time, the monitoring at step 200 may also include taking action. For example, if the fraud score satisfies a threshold (e.g., is above a maximum or below a minimum), then the network event is blocked. However, if the fraud score does not satisfy the threshold, then the network event is permitted.

However, step 202 includes detecting a failure of the machine learning model to generate, within the threshold time, a given fraud score for a given network event in the network events. Detecting may be determined by the threshold time passing without the fraud score being received by the server. Note that failure does not mean that the machine learning model does not or cannot generate the fraud score, or that the machine learning model fails to generate the score within the threshold time, only that that the fraud score is not received by the server controller within the allotted threshold time.

Step 204 includes determining, by the machine learning model and after the threshold time, the given fraud score. In other words, after the threshold time has passed, the given fraud score is still generated, received by the server controller, and logged. The machine learning model generates the fraud score at step 204 by taking the given vector for the given network event as input, and generating the given fraud score as output.

Step 206 includes logging, responsive to detecting the failure, the given network event in a first table. Logging includes logging the given fraud score. Logging may be performed by transferring the network event, metadata regarding the network event, and the fraud score, along with other desired information, into the first table. Each network event may be associated with a row of the table, and each piece of information may be associated with a column of the table. Thus, the table may store many instances of the given network event (i.e., those network events for which the failure of the machine learning model to respond in time was noted).

Step 208 includes determining a metric based on comparing the first table to a second table, wherein the second table logs at least the given fraud score and the fraud scores. As indicated above, the metric (126) is a measure of the performance of the machine learning model (140).

Step 210 includes generating an adjusted machine learning model by adjusting the machine learning model based on the metric. The machine learning model may be adjusted by changing one or more parameters of the machine learning model and then retraining the machine learning model. For example, the metric may be used as the basis for determining a loss function, and then the loss function used in a machine learning model training process, as described above. The retrained machine learning model may be the adjusted machine learning model.

However, the adjusted machine learning model also may be a new machine learning model which replaces the existing machine learning model. For example, based on automated rules, it may be determined that a different type of machine learning model should be used to detect fraudulent network events. Going forward, the new machine learning model is then used to detect fraudulent network events, which may then be blocked from affecting the protected subject.

In an embodiment, the method of FIG. 2 may terminate at step 210.

However, the method may also continue in some embodiments. Specifically, steps 212 through 220 represent a deployment phase of the adjusted machine learning model.

For example, step 212, includes receiving a new network event. The new network event may be received at a server over a network, as described above. The new network event attempts to access or use the protected subject of the machine learning model.

Step 214 includes determining a new fraud score for the new network event using the adjusted machine learning model. The new fraud score may be determined in a manner similar to that described with respect to step 204.

However, in step 214, the new fraud score is determined within the threshold time. Stated differently, the machine learning model determines the new fraud score in time for the machine learning model, the server controller, or other applications to take action with respect to the protected subject, as described with respect to steps 218 and 220, below.

Step 216 includes determining whether the new fraud score satisfies a fraud threshold. The fraud threshold is a number used to determine whether the new network event will be treated as fraudulent. For example, satisfying the fraud threshold may include determine whether the new fraud score is above, below, or equal to the fraud threshold.

If the new fraud score satisfies the fraud threshold (a "yes" at step 216), then step 218 includes blocking, responsive to the adjusted machine learning model predicting a new fraud score that is above a threshold fraud score, the new network event. The new network may be prevented from interacting with the protected subject. The new network event may be re-directed to a sandbox (i.e., a fake copy of the protected subject) in order to study the new network event, discern the source of the new network event, block the server from receiving other network events sent by the source of the new network event, or take some other action.

If the new fraud score does not satisfy the fraud threshold (a "no" at step 216), then step 220 includes permitting, responsive to the adjusted machine learning model predicting a new fraud score that is below a threshold fraud score, the new network event. In other words, the new network even is permitted to interact normally or as expected with respect to the protected subject.

The method of FIG. 2 may be further varied by including additional steps, removing some steps, or adjusting some steps. For example, the method of FIG. 2 also may include determining a weight based on a comparison of the first table to the second table. The weight, as described above, is a quantitative measure of a predicted impact that the given network event should have on the overall system, in order to account for variations in latency over time or geographical location.

In this case, the method also includes logging the weight. The weight may be logged in the first table. The logged weight then may be used to adjust the machine learning model based on both the metric and on the weight. For example, if the weight is a small number (e.g., less than 0.5), then the effect of the given network event on adjusting the machine learning model is reduced. However, if the weight is a large number (e.g., greater than 0.5), then the effect of the network event on adjusting the machine learning model is increased.

Specifically, the weight is used by generating an adjusted first table by adjusting a value of the first event in the first table using the weight. As a result, generating the metric further includes generating the metric using the adjusted first table.

In another example a variation is presented of adjusting the machine learning model by retraining the machine learning model, as described above. IN the variation, the method also includes generating, responsive to the metric satisfying a threshold value, adjusted training data by adjusting training data for the machine learning model based on the adjusted first table. For example, pre-existing training data of past network events may be updated with information from the given network event or other network events received over time after originally training the machine learning model. In this case, the machine learning model may be retrained using the adjusted training data.

In another variation, the method may be used after receiving a certain number of given network events, or after having received given network events over a period of time. For example, the method may include logging, after logging the selected event and prior to determining the metric, additional given network events for which the machine learning model failed to generate additional given fraud scores within the threshold time. In this case, the first table is populated with additional given network events.

Then, the additional given network events in the first table may be normalized. Normalization may be performed by comparing the first table to the second table, and adjusting the additional given network events using the weights that result from the comparison.

To further the example, normalizing may be performed in a batch process according to a time interval. For example, every hour, day, week, month, or other time interval, the given network events in the first table may be normalized. In this case, generating the adjusted machine learning model may be performed according to the time interval.

In another variation, determining the metric at step 208 may include identifying whether the given network event corresponds to an actual fraud event. Then, based on identifying whether the given network event corresponds to the actual fraud event, the given network event may be labeled as fraudulent or not fraudulent. Thereafter, a determination is made, based on labeling, an accuracy of the machine learning model at predicting actual fraud events. In this case, the accuracy may be, or include, the metric.

Attention is now turned to FIG. 3. FIG. 3 includes details of comparing the first table and the second table. Thus, the method of FIG. 3 may take place within step 208 of FIG. 2. Note that the method of FIG. 3 does not directly result in determining the metric. Rather, FIG. 3 is a method of comparing the first table to the second table, and more particularly determining a weight to be applied to the first table. The resulting weighted first table then may be used to determine the metric, which then may be used to adjust the machine learning model, as described above.

Step 300 includes grouping, in a first group, first data in the first table according to a grouping standard. The first data may be a type of the data within the first table, such as but not limited to the given fraud score for a given network event. The grouping standard may be a segment of the first data that is of interest. For example, the grouping standard may be geographical location (e.g., all given fraud scores for given network events that were received from England). In other examples, the grouping standard may be time (e.g., hour of the day), internet protocol addresses associated with the given network events, user identities of computing devices that generated the given network events, and many others.

Step 302 includes determining a first frequency of first network events having the grouping standard within the first table. The frequency is the number of given network events in the first table that satisfy the grouping standard. For example, the frequency may be a thousand given network events that match the grouping standard of having been received from User 1234 located in England between the hours of 13:00 hours and 14:00 hours, Greenwich mean time.

Step 304 includes grouping, in a second group, second data in the second table according to the grouping standard. Grouping at step 304 is similar to grouping at step 302. However, a similar grouping procedure is performed for those network events in the second table that meet the grouping standard.

Step 306 includes determining a second frequency of second network events having the grouping standard within the second table. Again, step 306 is similar to step 302, but performed with respect to the relevant events in second table. The "relevant" events are those events that meet the grouping standard.

Step 308 includes determining a ratio of the first frequency and the second frequency. The ratio may be determined by dividing the first frequency by the second frequency. However, the ratio may be determined by some other standard, such as dividing the second frequency by the first frequency, or by using some other function.

Step 310 includes determining an inverse ratio of the ratio of the first frequency and the second frequency. The inverse ratio may be determined by applying an inverse function to the ratio determined at step 308. Step 310 may be optional in some cases.

Step 312 includes weighting the first table by the inverse ratio. For example, the inverse ratio may be applied to those given fraud scores for the given network events in the first table that satisfy the grouping standard. The inverse ratio also may be applied to other given fraud scores in the first table. In one embodiment, the method of FIG. 3 may terminate thereafter, though the method of FIG. 2 may continue.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

Figure 4:
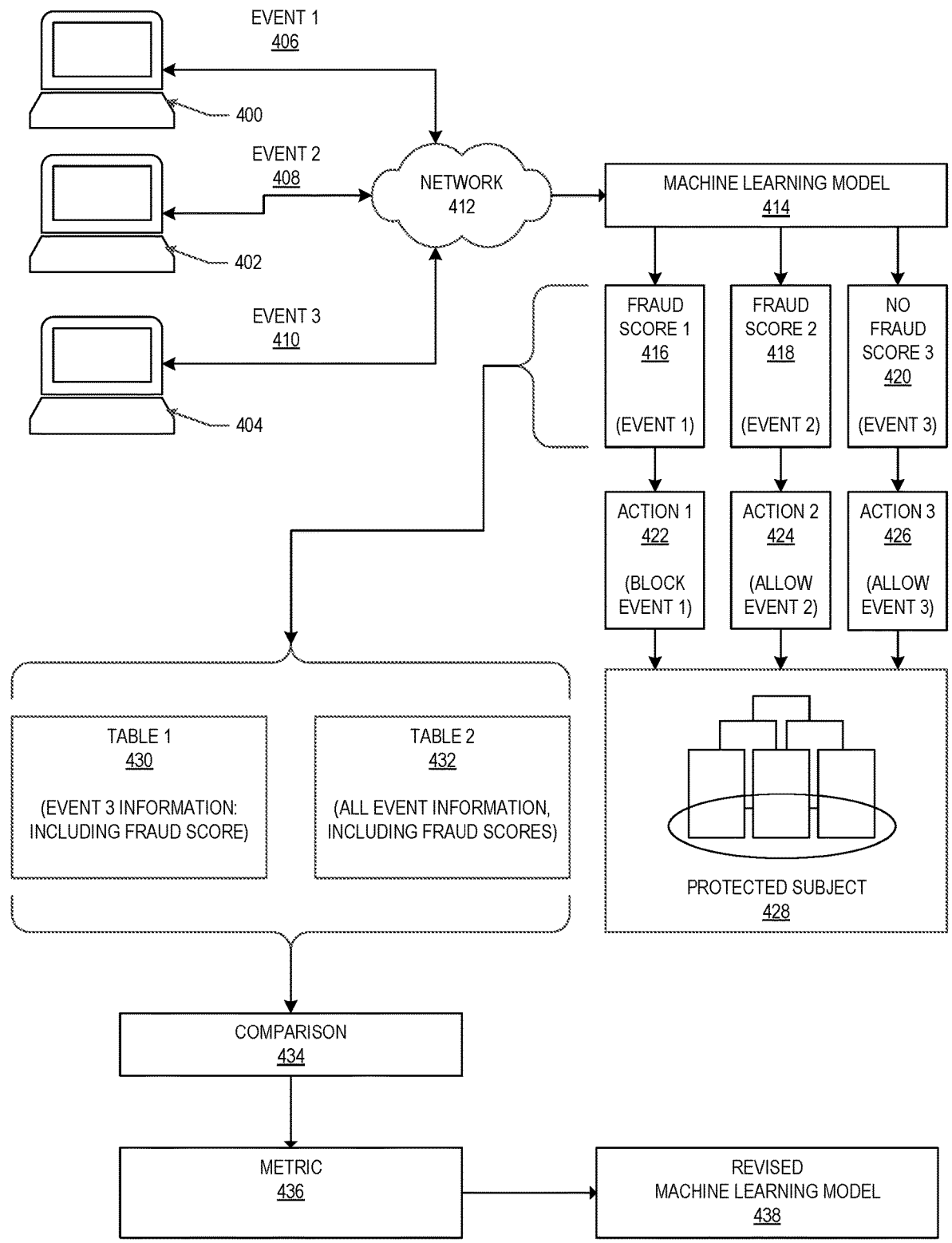
FIG. 4 shows an example of evaluating machine learning model performance by leveraging system failures, in accordance with one or more embodiments.

FIG. 4 shows an example of evaluating machine learning model performance by leveraging system failures, in accordance with one or more embodiments. The example of FIG. 4 may be implemented using the system shown in FIG. 1 and the methods described with respect to FIG. 2 or FIG. 3. The following example is for explanatory purposes only and not intended to limit the scope of the invention.

In the example of FIG. 4, three user devices (user device (400), user device (402), and user device (404)) transmit network events (event 1 (406), event 2 (408), and event 3 (410)) over a network (412). The network events are intercepted or otherwise received by a machine learning model (414).

The machine learning model (414) receives the network events in the form of vectors, with the vectors having been transformed from the network events by a server controller (such as the server controller (142) shown in FIG. 1). When executed, the machine learning model (414) attempts to generate fraud scores for the network events. Specifically, the machine learning model (414) generates fraud score 1 (416) for event 1 (406) and generates fraud score 2 (418) for event 2 (408). However, due to latency somewhere in the network (412), the machine learning model (414) does not generate fraud score 3 (420) for event 3 (410) within a threshold time. While the fraud score 3 (420) is eventually output by the machine learning model (414), the action taken by the anti-fraud software system will not be based on the fraud score 3 (420) because the fraud score 3 (420) was not generated within the threshold time.

In the example of FIG. 4, the fraud score 1 (416) satisfies a fraud threshold value. As a result, the anti-fraud software system takes action 1 (422), which is to block the event 1 (406). However, the fraud score 2 (418) does not satisfy the fraud threshold value. As a result, the anti-fraud software system takes action 2 (424), which is to allow the event 2 (408).

As indicated above, the anti-fraud software system does not receive the fraud score 3 (420) within the threshold time, due to latency in the network (412). Thus, the anti-fraud software system takes action 3 (426), which is to allow the event 3 (410).

Note that the event 3 (410) is allowed even though it is unknown whether the event 3 (410) is a fraudulent event or a legitimate event. In the example of FIG. 4, the event 3 (410) is a fraudulent event, though the remaining example would proceed in a similar manner if the event 3 (410) had been a legitimate event.

Allowed events are then passed to the protected subject (428). Thus, for example, the action 2 (424) and the action 3 (426) allow the event 2 (408) and the event 3 (410), respectively to reach and be processed by the protected subject (428). However, the action 1 (422) is to block the event 1 (406). Thus, the protected subject (428) does not receive or process the event 1 (406).

In this example, the protected subject (428) is an enterprise system which may be accessed by legitimate customers. The enterprise system may include one or more instances of software as a service, such as a financial management software application or a tax preparation software application. The network events in this case may be requests to log into or use or interact with the software as a service.

The fraud scores (the fraud score 1 (416), the fraud score 2 (418), and the fraud score 3 (420)) are also provided to one or more of table 1 (430) and table 2 (432). More particular, the fraud score 3 (420) is provided to the table 1 (430). Thus, the table 1 (430) stores the fraud score 3 (420). The table 1 (430) also may store other information regarding the event 3 (410), such as the user identifier of the user device (404), various information regarding the contents or header of the data packet that conveyed the event 3 (410), or other information. Additionally, all three of the fraud score 1

(416), the fraud score 2 (418), and the fraud score 3 (420) are stored in the table 2 (432). The table 2 (432) may also include other information regarding all three events, similar to the information described above for the event 3 (410).

Next the table 1 (430) is compared to the table 2 (432) to generate a comparison (434). In particular, a determination is made of the relative impact the event 3 (410) has compared to the overall existence of the event 1 (406), the event 2 (408), and the event 3 (410). As described above with respect to FIG. 3, a grouping standard may be used to compare the information in the two tables, and then a ratio may be determined. The ratio is applied to the fraud score 3 (420) and other information stored in the table 1 (430) for the event 1 (406). In this manner, the event 3 (410) is weighted in order to account for variations in the time the latency occurred, the location where the latency occurred, etc.

Then, a metric (436) is established based on the comparison (434). The metric (436) may be established as described with respect to FIG. 2. The metric is then used as a basis for generating a revised machine learning model (438), as also described with respect to FIG. 2. The revised machine learning model (438) may be a re-trained version of the machine learning model (414), or may be a replacement machine learning model.

Going forward, when the user device (402), and the user device (404) generate new network events, the revised machine learning model (438) is used to generate new fraud scores. The process described above may then be repeated as desired in order to continuously, or at certain time intervals, monitor the effectiveness of the machine learning model (414) or the revised machine learning model (438). The machine learning model may be updated accordingly, continuously or at the time intervals.

Thus, the revised machine learning model (438) may be kept current and operating at an improved effectiveness, relative to other monitoring techniques, but without deliberately allowing fraudulent network events from reaching the protected subject (428). Accordingly, not only is the machine learning model (414) or the revised machine learning model (438) efficiently updated in an improved manner, but the cost to perform the updating is reduced relative to monitoring techniques that rely on deliberately permitting fraud to establish a control group of network events.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   monitoring, using a machine learning model, a protected subject comprising an enterprise system including one or more instances of software as a service, wherein:
   the machine learning model is programmed to receive, as input, a plurality of network events associated with the protected subject,
   the machine learning model is programmed to generate, as output, a plurality of fraud scores associated with ones of the plurality of network events, and
   the plurality of fraud scores represent corresponding probabilities that ones of the plurality of network events are fraudulent;
   detecting a failure of the machine learning model to generate, within a threshold time, a given fraud score for a given network event in the plurality of network events;
   determining, by the machine learning model and after the threshold time, the given fraud score;
   logging, responsive to detecting the failure, the given network event in a first table, wherein logging includes logging the given fraud score;
   determining a metric based on comparing the first table to a second table, wherein the second table logs at least the given fraud score and the plurality of fraud scores;
   generating an adjusted machine learning model by adjusting the machine learning model based on the metric; and
   monitoring, using the adjusted machine learning model, future network events associated with the protected subject.

2. The method of claim 1, further comprising:
   determining a weight based on a comparison of the first table to the second table,
   wherein logging further comprises logging the weight, and
   wherein adjusting the machine learning model based on the metric is further based on the weight.

3. The method of claim 2, further comprising:
   generating an adjusted first table by adjusting a value of the given network event using the weight,
   wherein generating the metric further comprises generating the metric using the adjusted first table.

4. The method of claim 3, wherein adjusting the machine learning model further comprises:
   generating, responsive to the metric satisfying a threshold value, adjusted training data by adjusting training data for the machine learning model based on the adjusted first table; and
   retraining the machine learning model using the adjusted training data.

5. The method of claim 4, wherein adjusting the training data comprises adding the adjusted first table to pre-existing training data comprising past network events.

6. The method of claim 1, further comprising:
   blocking, responsive to the adjusted machine learning model predicting a new fraud score that is above a threshold fraud score, a new network event.

7. The method of claim 1, further comprising:
   permitting, responsive to the adjusted machine learning model predicting a new fraud score that is below a threshold fraud score, a new network event.

8. The method of claim 1, further comprising:
   logging, after logging the given network event and prior to determining the metric, a plurality of additional given network events for which the machine learning model failed to generate additional given fraud scores within the threshold time,
   normalizing, prior to determining the metric, the plurality of additional given network events in the first table.

9. The method of claim 8,
   wherein normalizing is performed in a batch process according to a time interval, and
   generating the adjusted machine learning model is performed according to the time interval.

10. The method of claim 1, wherein comparing the first table to the second table comprises:

grouping, in a first group, first data in the first table according to a grouping standard,
determining a first frequency of first network events having the grouping standard within the first table,
grouping, in a second group, second data in the second table according to the grouping standard,
determining a second frequency of second network events having the grouping standard within the second table, and
determining a ratio of the first frequency and the second frequency.

11. The method of claim 10, further comprising:
determining an inverse ratio of the ratio of the first frequency and the second frequency.

12. The method of claim 11, wherein the method further comprises:
weighting the first table by the inverse ratio.

13. The method of claim 1, wherein determining the metric comprises:
identifying whether the given network event corresponds to an actual fraud event,
labeling, based on identifying whether the given network event corresponds to the actual fraud event, the given network event as fraudulent or not fraudulent, and
determining, based on labeling, an accuracy of the machine learning model at predicting actual fraud events, wherein the accuracy comprises the metric.

14. The method of claim 1, wherein generating the adjusted machine learning model further comprises:
generating a loss function based on the metric, and
retraining, using the loss function, the machine learning model.

15. The method of claim 1, wherein generating the adjusted machine learning model further comprises:
selecting a new machine learning model based on the metric, and
using the new machine learning model to predict whether future network events are fraudulent.

16. A system comprising:
a processor;
a network adapter in communication with the processor, the network adapter establishing communication between the processor and a network;
a protected subject comprising an enterprise system including one or more instances of software as a service;
a data repository in communication with the processor, the data repository storing:
a plurality of network events received over the network, wherein the plurality of network events are associated with the protected subject,
a plurality of fraud scores representing a corresponding probability that a corresponding network event of the plurality of network events is fraudulent, wherein the plurality of fraud scores includes a given fraud score for a given network event in the plurality of network events,
a threshold time,
a first table storing first information related to the given network event, including at least the given fraud score,
a second table storing second information related to the plurality of network events, including at least the given fraud score and the plurality of fraud scores, and
a metric indicating a measure of performance of a machine learning model;
the machine learning model which, when executed by the processor, monitors the plurality of network events for the protected subject to generate prediction scores for the plurality of network events, wherein the prediction scores represent probabilities that the plurality of network events are fraudulent; and
a server controller which, when executed by the processor, is programmed to:
detect a failure of the machine learning model to generate, within the threshold time, the given fraud score,
receive, from the machine learning model, the given fraud score after the threshold time,
log the given fraud score in the first table,
determine the metric based on comparing the first table to the second table, adjust the machine learning model, based on the metric, to generate an adjusted machine learning model, and
monitor, using the adjusted machine learning model, future network events associated with the protected subject.

17. The system of claim 16, wherein the server controller, when executed by the processor, adjusts the machine learning model by performing at least one of:
commanding a training controller to re-train the machine learning model to form the adjusted machine learning model for predicting future network events, and
replacing the machine learning model with a new machine learning model for predicting the future network events.

18. The system of claim 16, wherein the server controller is further programmed to:
determine a weight based on a comparison of the first table to the second table,
wherein logging further comprises logging the weight, and
wherein adjusting the machine learning model based on the metric is further based on the weight, and
generate an adjusted first table by adjusting a value of the given network event in using the weight, wherein generating the metric further comprises generating the metric using the adjusted first table.

19. The system of claim 16, wherein the server controller is further programmed to perform one of:
block, responsive to the adjusted machine learning model predicting a new fraud score that is above a threshold fraud score, a new network event, and
permit, responsive to the adjusted machine learning model predicting the new fraud score being below the threshold fraud score, the new network event.

20. A non-transitory computer readable storage medium storing program code which, when executed by a processor, performs a computer-implemented method, the computer-implemented method comprising:
monitor, using a machine learning model, a protected subject comprising an enterprise system including one or more instances of software as a service, wherein:
the machine learning model is programmed to receive, as input, a plurality of network events associated with the protected subject,
the machine learning model is programmed to generate, as output, a plurality of fraud scores associated with ones of the plurality of network events, and
the plurality of fraud scores represent corresponding probabilities that ones of the plurality of network events are fraudulent;

detecting a failure of the machine learning model to generate, within a threshold time, a given fraud score for a given network event in the plurality of network events, determining, by the machine learning model and after the threshold time, the given fraud score, logging, responsive to detecting the failure, the given network event in a first table, wherein logging includes logging the given fraud score, determining a metric based on comparing the first table to a second table, wherein the second table logs at least the given fraud score and the plurality of fraud scores;

generating an adjusted machine learning model by adjusting the machine learning model based on the metric; and monitoring, using the adjusted machine learning model, future network events associated with the protected subject.

\* \* \* \* \*